United States Patent Office 3,492,354
Patented Jan. 27, 1970

3,492,354
RECOVERY OF HEXAMETHYLENE DIAMINE
Norbert F. Cywinski, Odessa, Tex., assignor to El Paso Products Company, Odessa, Tex., a corporation of Texas
No Drawing. Filed Sept. 13, 1966, Ser. No. 578,961
Int. Cl. C07c 85/16, 87/14
U.S. Cl. 260—583                                5 Claims

ABSTRACT OF THE DISCLOSURE

A process for the recovery and isolation of alkylene diamines from admixture with their inorganic halide salts which comprises treating the mixture with a base and extracting the resultant solution containing the alkylene diamines with a water immiscible solvent which is a solvent for the desired alkylene diamine product and distilling the extracted mixture. This process is particularly directed to recovery of hexamethylenediamine from its aqueous dihydrobromide salts.

---

This invention relates to the recovery of amines and, more particularly, to an improved method for the separation and recovery of substantially pure alkylene diamines from mixtures containing the same.

As is well known, the nylon industry has heretofore assumed a role of vast commercial importance due in large measure to the unique characteristics of polyamide type resins, which render them highly valuable for use in a wide variety of commercial applications. The ever-increasing demand for nylon-type products has correspondingly initiated wide-spread commercial demand for the provision of feasible processes for the production of nylon intermediates, especially the alkylene diamines, the most important being hexamethylenediamine. These latter materials are, of course, basic to the preparation of several grades of nylon and, accordingly, a large measure of industrial research effort has been directed to the discovery of improved processes for their synthesis and recovery in an economical manner.

One of the methods by which these alkylene diamines have been synthesized heretofore, has been by direct ammonolysis from corresponding alkylene dihalides, treatment of the resulting halide salts to free the diamine and subsequent recovery of the desired alkylene diamines.

While the process for production of the alkylene diamines from the dihaloalkane intermediate by reaction with ammonia, has been generally efficient, the actual recovery of pure alkylene diamines in quantitative amounts, as a practical matter, has not been entirely successful. In fact, the available prior art is not cognizant of a practical and economical process for the recovery of substantially pure alkylene diamines from an ammonolysis mixture containing the diamine as a halide salt.

Various means have been attempted in an effort to free the desired diamines from their dihalide salt with subsequent recovery of the desired product. However, none of these recovery systems have been entirely successful, although many have been tried.

One of the most common methods of purification is by routine distillation of the ammonolysis mixture under vacuum. However, this method has been generally uniformly unsatisfactory inasmuch as the last traces of the alkylene diamines has become progressively harder to separate from the halide salts, thus leading to the use of high temperatures with resultant localized overheating and decomposition of the diamine as well as loss of vacuum in the system. Therefore, this method has not offered a practical solution to the separation and isolation of the desired alkylene diamines in quantitative yields.

A second method which has been attempted with about the same type of success is by way of high temperature steam distillation of the diamine from its dihalide salt mixture. However, this method has not been satisfactory as the yields have been found to be too low to be economically attractive and purity of the alkylene diamine has not been commercially acceptable, thus necessitating a further purification step.

It is, accordingly, one object of this invention to provide an improved process for the separation and recovery of alkylene diamines which overcomes or otherwise mitigates all the objections and disadvantages incurred by the processes now known to the prior art.

A further object of the invention is to provide an improved process for the separation and isolation of substantially pure alkylene diamines from their halide salts contained in an ammonolysis mixture by means of a liquid-liquid extraction system.

A still further object of the invention is to provide an improved process for the separation and isolation of substantially pure hexamethylenediamine from its hydrobromide salt mixture obtained during the formation of the hexamethylenediamine by ammonolysis of the corresponding dihalohexane, which involves the liquid-liquid extraction of an aqueous solution of the hexamethylenediamine salt by means of a water-immiscible solvent.

In accordance with the process of this invention and in satisfaction of the above objects and advantages, there is presented a process for the recovery of alkylene diamines from their ammonolysis preparation mixtures which process comprises treating the mixture with an inorganic base and extracting an aqueous solution of the alkylene diamines and their inorganic halide salts with a immiscible solvent material and recovering a quantitative amount of the alkylene diamines in substantially pure form.

According to the process of the present invention, there has been discovered a practical and economical method for the quantitative recovery of alkylene diamines in substantially pure form, which alkylene diamines are well known to be useful in the synthesis of various grades of nylon. The process of this invention, therefore, obviates the need for further purification and isolation steps which have been necessary heretofore to provide alkylene diamines in a form sufficiently pure for commercially acceptance.

A preferred manner by which alkylene diamines may be prepared for purposes of this invention is by reaction of the corresponding dibromoalkane with a large excess of ammonia to produce the desired alkylene diamine and two moles of hydrogen bromide. The hydrogen bromide then reacts with the alkylene diamine to form hydrobromide salts of the alkylene diamine and free ammonia, which ammonia further reacts with additional hydrogen bromide to form ammonium bromide. In the process wherein hexamethylenediamine is the desired product, this series of reactions may be represented by the following equations:

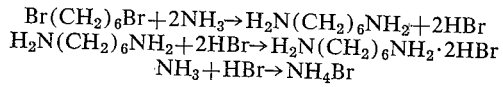

After completion of the ammonolysis reaction, the ammonia present in excess may be distilled to leave behind the hexamethylenediamine dihydrobromide salt.

This method represents a preferred manner for carrying out the basic ammonolysis process and the present invention will be described employing this manner of preparing the diamine salt.

One method for recovering free alkylene diamine from its dihydrobromide salt is to treat the mixture with an equivalent amount of caustic or sodium hydroxide and thereafter distilling the alkylene diamine from the mixture at low pressures. However, as pointed out above, distillation by conventional means has not given rise to economically acceptable yields and sufficiently pure products. Moreover, the use of sodium hydroxide or potassium hydroxide as the neutralizing agent has not been particularly economically attractive in view if the relatively high cost of these materials, and thus has resulted in an increase in the cost of the alkylene diamine intermediate product with resultant increase in the ultimate cost of nylon.

In view of the difficulties encountered with caustic, it is proposed, to substitute calcium hydroxide or other calcium oxide for the sodium hydroxide as the neutralizing base as these materials are relatively inexpensive and universally available. However, while calcium hydroxide or calcium oxide have been found to be operable and readily available, several problems have been introduced by their use.

It has been found that when calcium hydroxide, calcium oxide or equivalent base, is added to the alkylene diamine/hydrobromide salt mixture, calcium bromide is formed in almost quantitative amounts. Although the calcium bromide is very soluble in water, its solubility has been found to be greatly reduced in the presence of the alkylene diamine, which phenomena is evidently due to the formation of a very stable coordination complex. After formation of this complex, it has been found to be very difficult to effect suitable separation of the alkylene diamine from its hydrobromide salt by means known heretofore. In particular, the use of conventional vacuum distillation and steam distillation have been almost entirely unsuccessful in producing adequate yields of the desired free alkylene diamines in a substantially pure form.

It is to be seen, therefore, that the liquid-liquid extraction process of this invention has particular application to the isolation and recovery of substantially pure alkylene diamines from the mixture formed by treatment of the alkylene diamine hydrobromide salt with calcium hydroxide. However, it is to be understood that the isolation and recovery of the alkylene diamine according to the process of this invention is considered to be applicable to mixtures comprising the salt of alkylene diamines when treated with other inorganic salts, such as sodium hydroxide, potassium hydroxide and the like.

As the process has been found to be particularly applicable to the recovery of substantially pure hexamethylenediamine from the reaction of its hydrobromide salt with calcium hydroxide, the process will be specifically described employing this embodiment. However, it is to be understood that the process is also considered to be applicable to the recovery of other analagous alkylene diamines from their hydrobromide salts after treatment with a suitable inorganic base.

As pointed out hereinabove, the process of this invention comprises extracting the alkylene diamine/dihalide salt mixture with a solvent which is immiscible with the aqueous reaction mixture but which has solubility for the alkylene diamine desired to be recovered in the presence of the mixture.

The immiscible solvent with which the hexamethylenediamine is to be extracted, in addition to being a solvent for the diamine, should also exhibit sufficient stability and satisfactory viscosity, as well as insolubility for the metal halide salt in order to be employed in the process. Moreover, it is preferred that the extraction solvent be capable of forming a water azeotrope so that any water present could be easily removed by simple azeotropic distillation. An even more important criteria is that the solvent have a high solubility for the hexamethylenediamine in the presence of the halide salt, e.g., calcium bromide.

In carrying out the process, the hexamethylenediamine hydrobromide salt is admixed with the aqueous solution of calcium hydroxide or calcium oxide displacing agents and the mixture heated for a short period to achieve complete displacement of the hydrobromide salt by the calcium salt displacing agent. Thereafter, the immiscible extraction solvent is added and the mixture slowly refluxed to effect solution of the diamine in the extraction solvent. Subsequently the solvent is separated from the aqueous mixture at atmospheric pressure. Thereafter, the separated solvent solution is subjected to vacuum distillation from which the free and substantially pure hexamethylenediamine is recovered.

The immiscible solvents which are employed to advantage in the process of the invention include a large number of inorganic compounds which are immiscible with water and also are solvents for the alkylene diamine. Of these several materials, there may be mentioned alcohols, amines, ethers and amides. Specific solvents which have been found to be especially suitable for use in the process of this invention include n-amyl alcohol, isoamyl alcohol, cyclohexanol, n-octanol, n-butyl alcohol, n-pentyl alcohol, 3-methylpentanol, isobutyl alcohol, toluene, ethyl ether, tertiary butyl alcohol and the like. Particularly preferred solvents are n-amyl alcohol and isoamyl alcohol as these materials have been found to give particularly good results and nearly quantitative recovery of substantially pure hexamethylenediamine from the mixture.

The following examples are intended to illustrate the process of the invention but are not to be construed as limiting thereon.

EXAMPLE I 50 grams of calcium bromide and 10 grams of hexamethylenediamine were dissolved in 400 ml. of water and the solution placed in a continuous extraction unit having a nominal capacity of 1 liter. Thereafter, 1200 ml. of n-amyl alcohol was added to the system and extraction was carried out for 23 hours by maintaining a low reflux on the system. At the end of the extraction period, the amyl alcohol solution in the boil-up kettle was titrated with previously standardized hydrochloric acid. The results of the titration indicated that 99% of the hexamethylenediamine was in the boil-up kettle and only 1% remained in the aqueous phase containing the calcium bromide. This example, therefore, illustrates that the hexamethylenediamine may be quantitatively extracted and subsequently isolated in the presence of the calcium bromide-water mixture employing the process of this invention.

EXAMPLE II 120 grams of hexamethylenediamine dihydrobromide (.432 gram mole), 33.4 grams of 98% calcium hydroxide (.441 gram mole), and 600 ml. of water were placed in a continuous extractor having a nominal capacity of 1 liter. Thereafter, sufficient n-amyl alcohol was added to half fill the boil-up kettle. The aqueous phase was thereafter extracted for 7 hours by maintaining the solution at a low reflux. At the end of the extraction period, the amyl alcohol solution in the boil-up kettle was titrated with hydrochloric acid having a titer value of 0.312 gram of hexamethylenediamine per milliliter. The titration required 130.5 ml. of acid. Fresh n-amyl alcohol was then placed in the kettle and the extraction continued for an additional 3 hours. After completion of the additional extraction period, 32.3 ml. of acid were acquired to titrate the alcohol in the kettle. Total acid consumption was 162.8 ml. accounting for .438 gram mole of hexamethylenediamine which represents a yield recovery of 101%. Thus this example illustrates that quantitative recovery of the hexamethylenediamine may be effected using at most two extraction steps.

It is obvious that various modifications with respect to the invention may become obvious to persons skilled in the art. Such modifications and variations include, for example, the substitution of various extraction solvents which fall within the criteria outlined in the present disclosure and which are operable in the extraction of the alkylene diamines from their salt mixtures. Moreover, various modifications may be envisioned for carrying out the actual extraction process and various types of extraction apparatus and methods are well known to the art.

The invention has been described with respect to certain preferred embodiments thereof and there will become obvious to persons skilled in the art other variations, modifications, and equivalents which are to be understood as coming within the scope of the present invention.

What is claimed is:

1. A process for the recovery and isolation of hexamethylenediamine from hexamethylenediamine dihydrobromide which comprises treating said hexamethylenediamine dihydrobromide with calcium hydroxide and extracting said hexamethylenediamine with normal-amyl alcohol.

2. A process according to claim 1 wherein the hexamethylenediamine dihydrobromide and calcium hydroxide are contained in aqueous solution.

3. A process according to claim 2 wherein the normal-amyl alcohol and aqueous solution are heated to effect solution of the hexamethylenediamine in the normal-amyl alcohol.

4. A process according to claim 3 wherein the normal-amyl alcohol extract is subsequently distilled to recover an alcohol fraction and a hexamethylenediamine fraction.

5. A process according to claim 3 wherein the mixture is heated at reflux.

References Cited

UNITED STATES PATENTS 2,802,030   8/1957   Ashby.

CHARLES B. PARKER, Primary Examiner

RICHARD L. RAYMOND, Assistant Examiner

U.S. Cl. X.R.

260—704, 705